United States Patent [19]

Typpi

[11] Patent Number: 4,653,410
[45] Date of Patent: Mar. 31, 1987

[54] SEED PLANTER

[76] Inventor: Richard M. Typpi, 630 Hall La., Minneapolis, Minn. 55411

[21] Appl. No.: 794,799

[22] Filed: Nov. 4, 1985

Related U.S. Application Data

[63] Continuation-in-part of Ser. No. 710,449, Mar. 11, 1985, abandoned.

[51] Int. Cl.$^4$ .............................................. A01C 7/18
[52] U.S. Cl. ........................................ 111/1; 111/52; 111/85
[58] Field of Search ................... 111/1, 14, 9, 34, 42, 111/52, 53, 55, 59, 62, 63, 73, 78, 80, 81, 85, 87, 14–16, 56, 61, 71, 77; 221/253; 222/371, 415, 609, 610

[56] References Cited

U.S. PATENT DOCUMENTS

| | | | |
|---|---|---|---|
| 12,152 | 1/1855 | Anderson | 222/371 |
| 283,459 | 8/1883 | Bapple | 111/16 |
| 503,695 | 8/1893 | Chubbuck | 111/42 |
| 660,599 | 10/1900 | Svensen | 111/63 |
| 1,041,275 | 10/1912 | Harris | 111/56 |
| 1,169,945 | 2/1916 | Everson | 172/398 |
| 1,262,143 | 4/1918 | Griplat | 111/61 |
| 1,957,738 | 5/1934 | Strandlund | 111/67 |
| 2,141,044 | 12/1938 | Rassmann | 111/34 |
| 2,249,637 | 7/1941 | Rietz | 111/85 |
| 2,571,407 | 10/1951 | Bauer | 111/60 |
| 2,758,756 | 8/1956 | Fea | 222/371 X |
| 2,935,957 | 5/1960 | Denton | 111/34 |
| 3,055,322 | 9/1962 | Oehler et al. | 111/52 |
| 3,077,290 | 2/1963 | Rehder | 111/77 X |
| 3,148,644 | 9/1964 | Keeton | 111/85 X |
| 3,272,159 | 9/1966 | Sanderson | 111/71 |
| 3,413,941 | 12/1968 | Roberson | 111/77 |
| 3,561,380 | 2/1971 | Adams | 111/89 |
| 3,610,185 | 10/1971 | Scarborough | 111/61 |
| 3,611,956 | 10/1971 | Moore et al. | 111/62 |
| 3,912,121 | 10/1975 | Steffen | 111/1 |
| 3,923,206 | 12/1975 | Gillis et al. | 111/86 |
| 3,999,690 | 12/1976 | Deckler | 222/194 |
| 4,057,111 | 11/1977 | Van Der Lely et al. | 172/72 |
| 4,091,751 | 5/1978 | Dri et al. | 111/52 |
| 4,108,089 | 8/1978 | Van Der Lely | 111/7 |
| 4,191,261 | 3/1980 | Sylvester | 172/459 |
| 4,193,357 | 3/1980 | Freeman et al. | 111/34 |

FOREIGN PATENT DOCUMENTS

| | | | |
|---|---|---|---|
| 250022 | 9/1962 | Australia | 111/34 |
| 206192 | 1/1909 | Fed. Rep. of Germany | 222/371 |
| 2657275 | 6/1978 | Fed. Rep. of Germany | 111/1 |
| 2748247 | 5/1979 | Fed. Rep. of Germany | 111/87 |
| 129511 | 3/1962 | France | 111/34 |
| 1408127 | 6/1965 | France | 221/253 |
| 795062 | 5/1958 | United Kingdom | 111/77 |
| 2057835 | 4/1981 | United Kingdom | 111/34 |

Primary Examiner—James R. Feyrer
Attorney, Agent, or Firm—Orrin M. Haugen; Thomas J. Nikolai

[57] ABSTRACT

A trailer-like apparatus adapted to be towed by a farm implement for depositing seed from a supply hopper into the ground at a controlled spacing substantially independent of the vehicle's relative ground speed. In a first embodiment, an endless chain having pockets for receiving individual seeds from a supply hopper affixed to predetermined lengths of the chain is driven by a sprocket wheel which is, in turn, belt-coupled to a ground-engaging towed wheel of the vehicle. The chain is longitudinally aligned rearward of a disk-like colter which digs the trench into which the seeds ultimately fall and the trench is then closed as the vehicle's frame supporting wheels pass by the trench. Means are provided for elevating the colter, the chain-driving wheel and the supply hoppers when, at the end of a planting row and when moving to or from the planting site. In an alternative embodiment, an endless chain having pockets for receiving individual seeds from a supply hopper, affixed to predetermined lengths of the chain, is driven by a sprocket wheel which is, in turn, miter gear-coupled to a drive shaft turned by a low-speed, high-torque hydraulic motor controlled by a hydraulic flow control valve rather than by a ground-engaging wheel.

18 Claims, 10 Drawing Figures

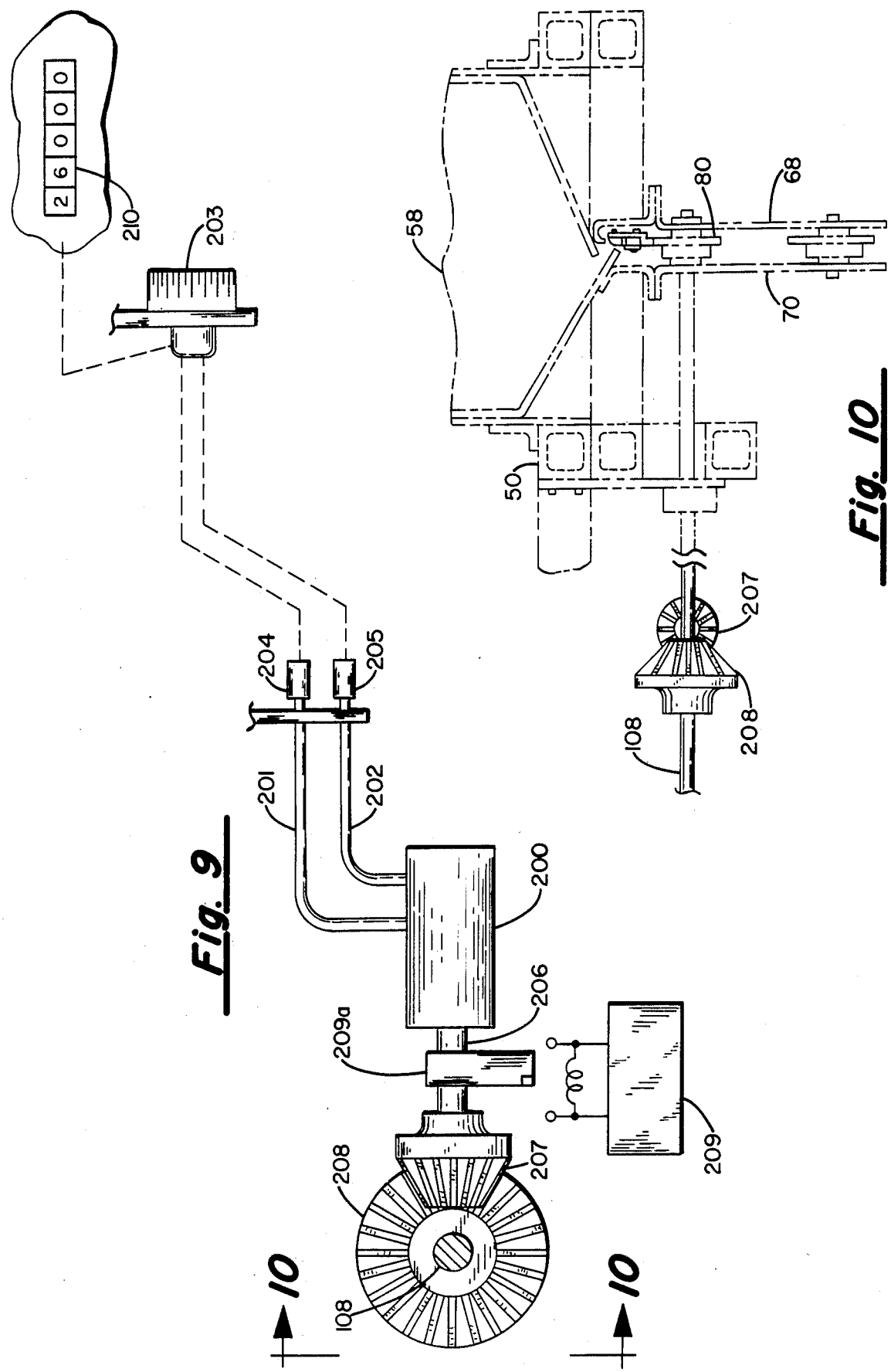

SEED PLANTER

CROSS-REFERENCE TO RELATED APPLICATION

The present application is a Continuation-in-Part of my co-pending application Ser. No. 06/710,449, filed Mar. 11, 1985, and abandoned, entitled "IMPROVED SEED PLANTER".

BACKGROUND OF THE INVENTION

I. Field of the Invention:

This invention relates generally to seed planting apparatus, and more particularly to an improved planter which may be used to accurately and precisely position a crop seed into the ground at a spacing which can be readily adjusted in a first embodiment, within limits, by the simple adjustment of a pulley size, and in a second embodiment by the adjustment of a hydraulic flow control valve.

II. Discussion of the Prior Art:

In the Adams U.S. Pat. No. 3,561,380, there is described a seed planter which incorporates an endless belt as a conveyor, the belt having a plurality of openings call "seed pockets" formed therealong for receiving individual seeds from a hopper and for carrying those seeds to a location where the conveyor belt engages the ground. Ideally, the conveyor belt is driven so that the ground-engaging flight is moving in a direction opposite to the direction of movement of the seed planter and at the same relative velocity so that the effective ground speed of the conveyor is zero. Associated with the conveyor belt is a further belt having protuberances thereon at a spacing corresponding to the spacing between the pockets on the belt. The protuberances are configured to enter the openings forming the seed pockets and to force the seeds therefrom into the ground.

While, in theory, the device described in the Adams U.S. Pat. No. 3,561,380 may appear operable, in practice, a device made in accordance with this patent would be of limited operability. First of all, the manner in which the hopper is positioned relative to the seed-receiving belt necessarily limits the capacity of the hopper. Accordingly, it is necessary to refill the hopper at more frequent intervals than would otherwise be required. Also, practical difficulties are encountered in loading the seed pockets in the belt from the hopper and in unloading same when it is considered that the conveyor belt must be moving at the vehicle's ground speed to maintain the necessary zero relative motion between ground and the belt. The system of the Adams U.S. Pat. No. 3,561,380 also suffers from the defect in that the spacing between adjacent seeds cannot be controlled and is strictly limited to the spacing between seed openings on the belt itself. As such, the device of the Adams patent cannot be used to plant more than one commodity if those commodities require different seed-to-seed spacing.

SUMMARY OF THE INVENTION

My invention, while somewhat similar in concept to the apparatus disclosed in the Adams patent, overcomes most of the drawbacks of the prior art. In accordance with a first embodiment of my invention, I provide a first or main frame which is supported by a pair of rear dual wheels and a secondary frame which is pivotally coupled to the axle on which the pair of dual wheels are journaled. Affixed to the upper side of the secondary frame are left and right seed hoppers, which are generally rectangular boxes but which have bottoms which slope to an elongated gap or seed orifice near the middle thereof. Also supported by the secondary frame is a further axle upon which a ground-engaging wheel is affixed. Mounted on this same axle is a pulley which may have adjustable sheaves for effectively varying the diameter of that pulley. An endless belt joins that pulley to a further pulley mounted on an idler shaft, and affixed to that idler shaft are first and second sprocket wheels which are generally aligned with the longitudinal orifice in the sloped bottoms of the seed hoppers. Joined to the underside of the secondary frame are downwardly depending bearing plates which support disk-like colters which, when dragged over the ground, will dig a trench of a predetermined depth. An endless chain passes over the sprockets on the idler shaft, and attached to predetermined links of that endless chain are specially designed seed pockets which are capable of receiving only one seed in each pocket as it passes beneath the seed orifice in the bottom of the hopper. As the endless chain orbits, the seed will be carried to a discharge point just above the ground where it will fall free from the pocket and into the furrow formed by the colter. As the vehicle continues to move, the dual rear tires are so positioned that they will effectively close the furrow over the deposited seeds. In that the seed conveying chain does not contact the ground, it is not a requirement that it move at the appropriate speed to create zero relative velocity between the conveyor and the ground as in the Adams patent. Hence, it is possible that by adjusting the relative diameters of the pulleys on the drive shaft and the idler shaft, the seed may be dropped at locations other than those dictated by the spacing between the seed receiving pockets on the chain. By having more than one chain, each with its own especially dimensioned seed pockets, the planter of the present invention can be used to plant a variety of row crops by merely substituting chains.

A hydraulic actuator is suitably disposed between the main frame and the secondary pivoting frame so that, when actuated, the secondary frame pivots about the axle of the dual wheels as a fulcrum and elevates the colters and the conveyor chain drive wheel from the ground. Thus, upon reaching the end of a row, the farmer can merely operate the hydraulic cylinder to raise the colters and stop the seed flow. Likewise, when driving over a highway to or from the planting site, the colters and conveyor chain drive wheel are maintained in their elevated and stopped position.

Also described herein is an alternative embodiment of my invention. In this alternative embodiment, a constant torque hydraulic motor is used to cause rotation of the endless chain which carries seed from the hopper to the discharge point which is just above the ground. The speed at which the constant torque hydraulic motor is driven can be varied by actuating a control flow valve. In this alternative embodiment, an rpm counter and a digital display permit the user to control the discharge rate of the seed. By locating the control flow valve and the digital readout in the cab in the tractor, the operator can fully control the rate at which seed is discharged from the cab.

OBJECTS

Accordingly, it is the principal object of the present invention to provide a new and improved seed planting apparatus.

Another object of the invention is to provide a seed planting apparatus in which the spacing between seeds being planted can be readily adjusted.

Another object of the invention is to provide a seed planter in which the capacity of the seed hoppers is not limited by the physical disposition of the seed conveying belt associated therewith.

A still further object of the invention is to provide a seed planter of the type involving an endless conveyor chain for transporting seeds from a supply hopper to a desired location close to the ground but in which the conveyor does not actually physically contact the ground.

A further object of the invention is to provide a seed planter in which the flow of seed and the digging of furrows for the seed can be readily controlled.

These and other objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE DRAWINGS

FIGS. 9 and 10 are views showing an alternative means for driving the seed conveyor chain.

DESCRIPTION OF A PREFERRED EMBODIMENT

Figure 1:
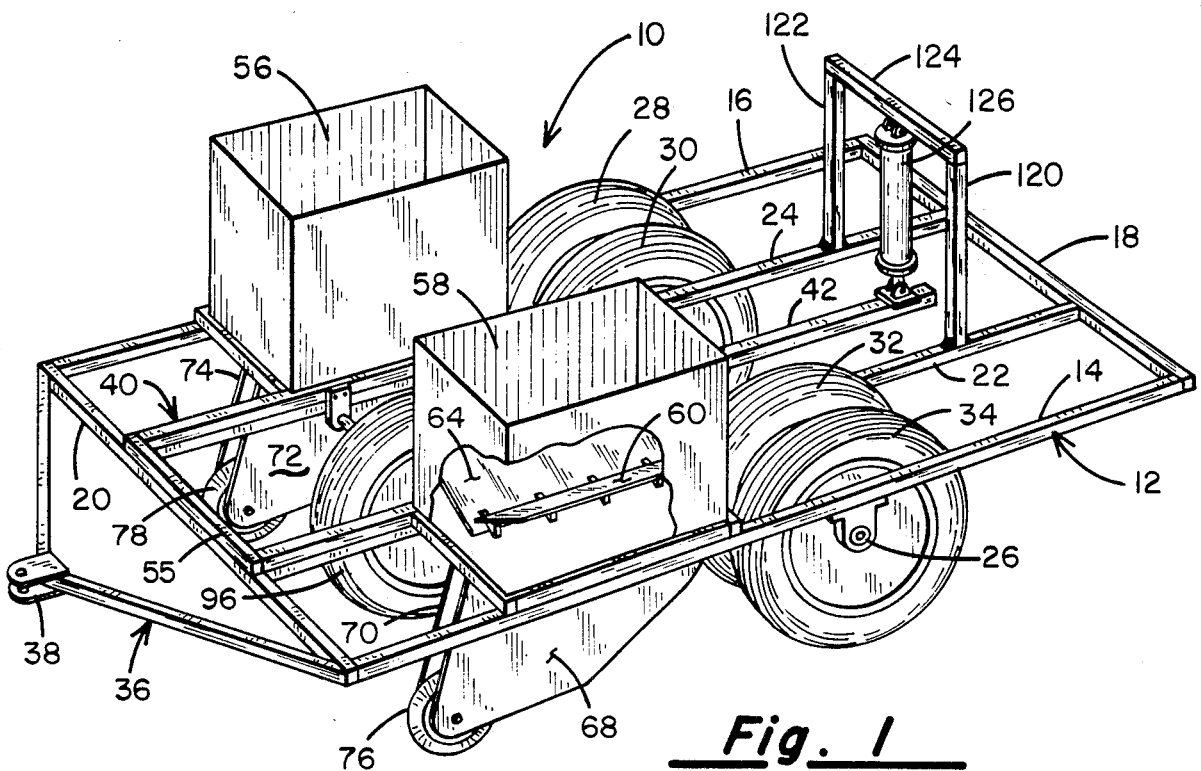
FIG. 1 is a perspective view of the preferred embodiment.

Certain terminology will be used in the following description for convenience in reference only and should not be construed as limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. This terminology is intended to include the words specifically mentioned above, derivatives thereof as well as words of similar import.

Referring first to FIG. 1 there is indicated generally by numeral 10 a seed planter comprising a first preferred embodiment of the present invention. The planter 10 includes a main frame member indicated generally by numeral 12 which is preferably formed from steel tubing and which includes left and right side members 14 and 16, a rear end member 18, a front end member 20 and two intermediate, spacedapart, longitudinally-extending braces 22 and 24. Extending transversely to the frame members 14 and 16 is an axle 26 on which first and second sets of dual rear wheels 28–30 and 32–34 are journaled for rotation.

A yoke assembly 36 is welded to the front end member 20 and at the center thereof is a clevis 38 by which the planter assembly 10 can be fastened to a towing vehicle by means of a hitch pin (not shown).

Figure 4:
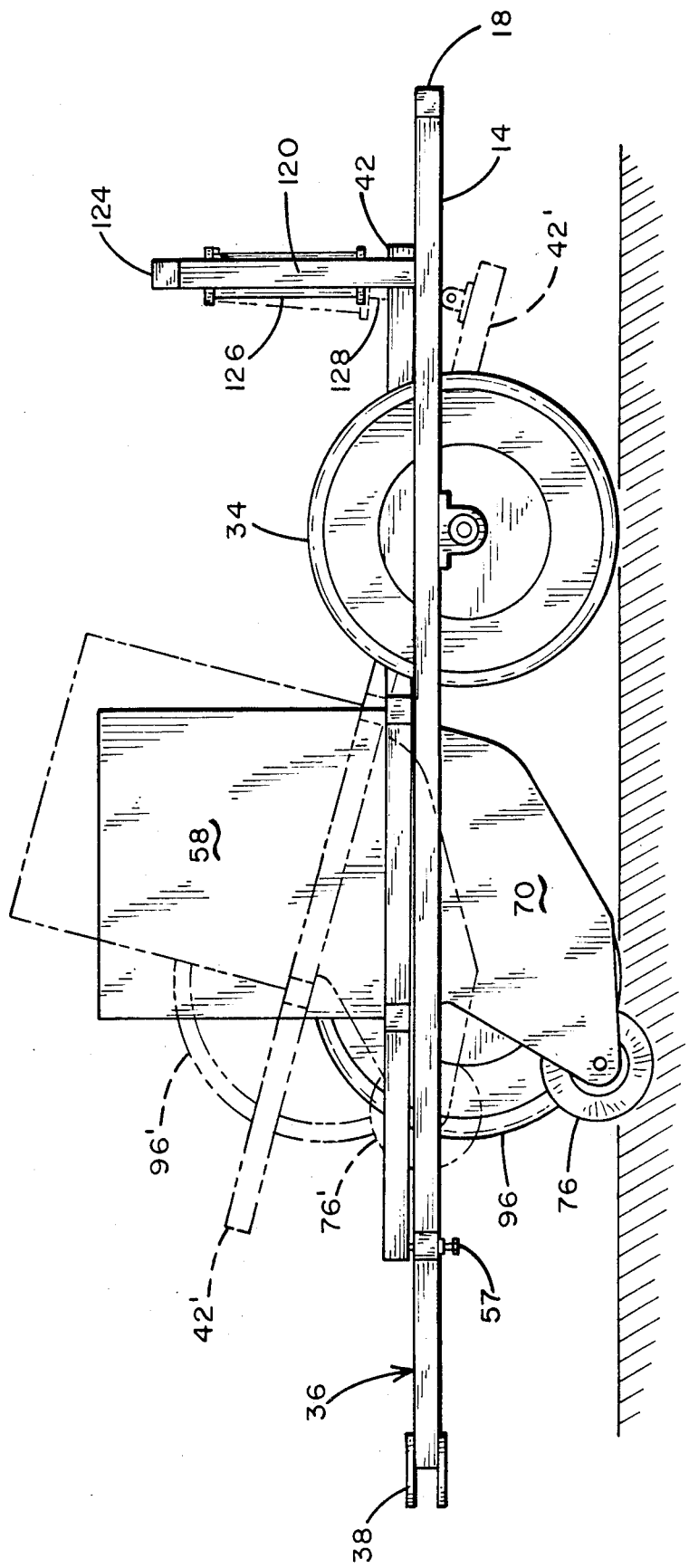
FIG. 4 is a side elevation view showing the secondary frame in its raised and lowered positions.
Figure 7:
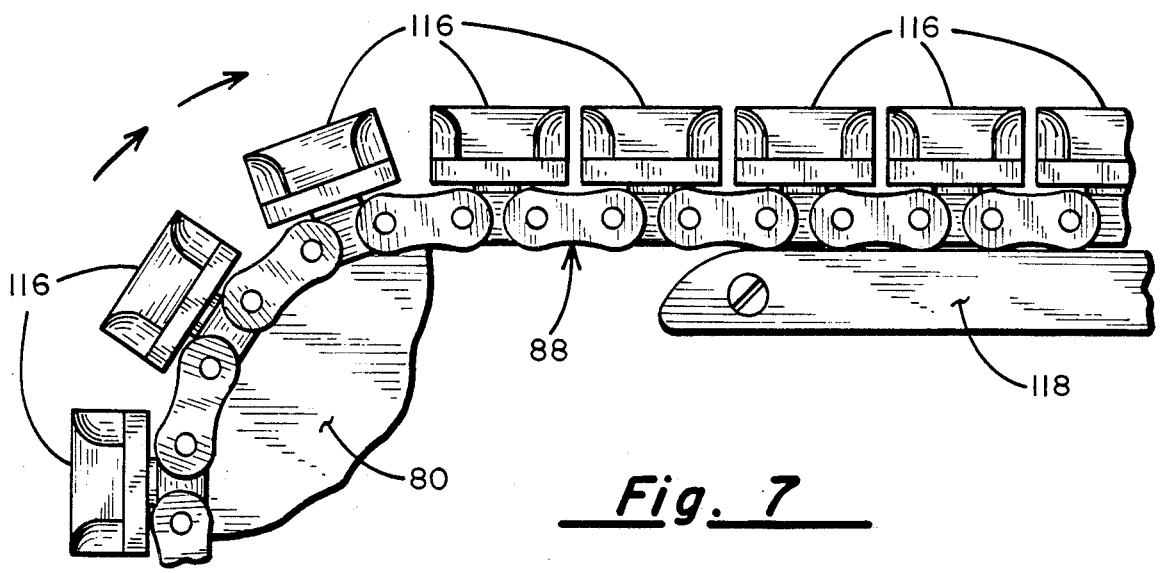
FIG. 7 is a fragmentary view of the seed conveyor chain.

Resting atop the main frame 12 is a secondary frame, which is indicated generally by numeral 40, and which has a longitudinal bar member 42 extending lengthwise approximately along the mid-line axis of the planter frame. The bar member 42 has a bearing housing 44 welded thereto and passing through the bearing housing 44 is the axle member 26. As such, the member 42 of the secondary frame can be rocked or pivoted about the axle 26 as a fulcrum. Welded to the member 42 is a transversely extending bar 46 of a length so that the end portions thereof rest atop the side members 14 and 16 comprising the lower frame 12. Welded to and projecting forwardly from the transversely extending bar 46 are frame members 48 and 50 which respectively overlay the intermediate support braces 22 and 24 of the lower main frame 12. For the purposes of adding rigidity to the secondary frame, further cross members 52 and 54 are welded or otherwise affixed to the upper or secondary frame 40. A cross-strut 55 extends between the forward ends of longitudinal frame members 48 and 50 and rests upon leveling jack-screws 57 (FIG. 4). The jack-screws allow limited height adjustment of the colters whereby the depth of the furrow being dug can be set.

Figure 2:
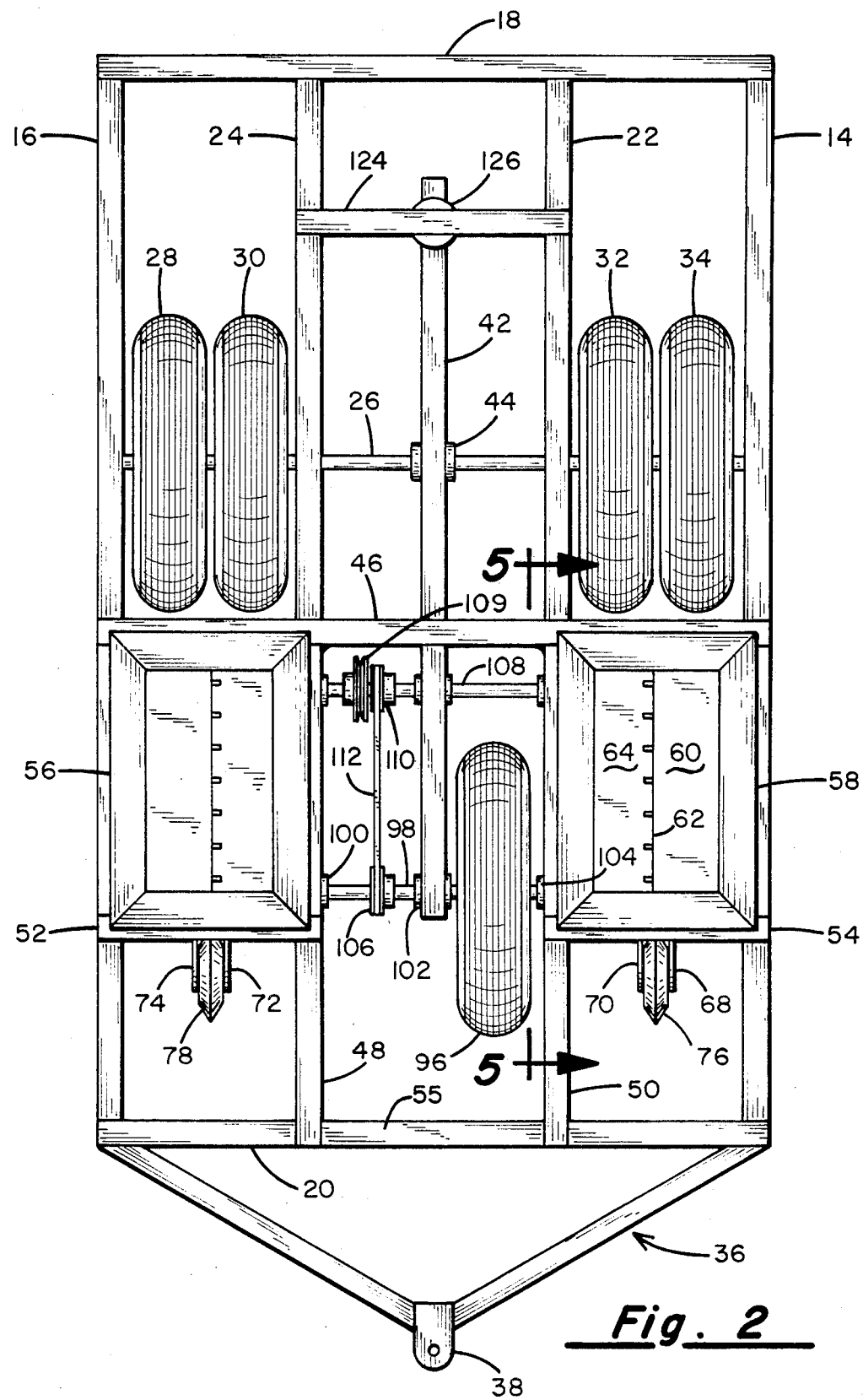
FIG. 2 is a top plan view of the embodiment of FIG. 1.
Figure 6:
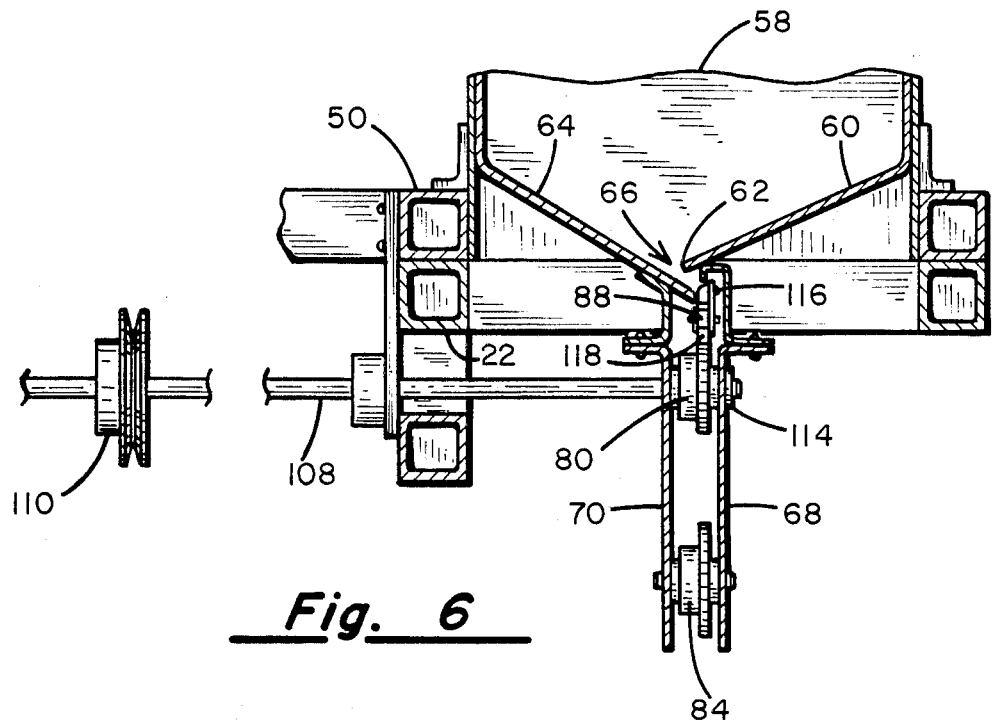
FIG. 6 is a sectional view taken along the lines 6—6 in FIG. 5.

A pair of seed hoppers 56 and 58 are attached to the secondary frame and are supported by the cross member 46 and the reinforcing bars 52 and 54, all as can best be observed in the plan view of FIG. 2. The seed boxes 56 and 58 may be generally rectangular in their configuration but the bottom walls thereof are sloped downwardly from their side edges towards the centerline of the hoppers. As shown in FIGS. 1 and 6, a first bottom defining plate 60 is spaced vertically at its end 62 from the end of the other bottom-defining plate 64. The end 62, however, overlaps the end of the bottom segment 64 and defines a generally longitudinal slit 66 through which the seed kernels may pass. A plurality of spacer elements are used to maintain the plate separation defining the slit 66.

Attached to the underside of the secondary frame and beneath each of the hoppers 56 and 58 are two parallel, spaced-apart bearing plates 68–70 and 72–74. These sets of bearing plates project downwardly toward the ground and at the lower forward edge thereof are bearings in which disks or colters 76 and 78 are journaled. The bearing plates are positioned such that colters 76 and 78 are longitudinally aligned with the spacing between the dual rear tires 28–30 and 32–34 and generally with the longitudinal slit 66 in the bottoms of the hoppers.

Figure 5:
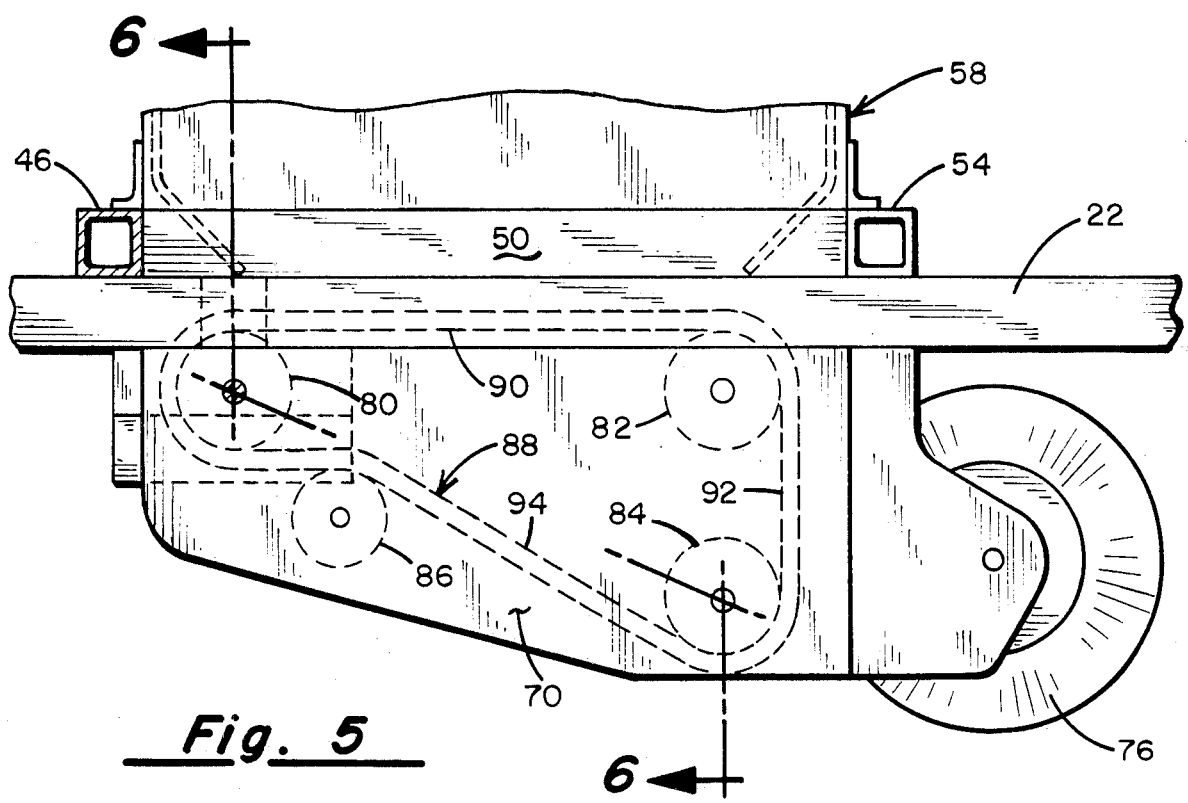
FIG. 5 is a partial side sectional view taken along the lines 5—5 in FIG. 2.

By referring to FIGS. 5 and 6, it can also be seen that journaled between the bearing plates 68 and 70 are sprocket wheels 80, 82 and 84 and idler sprocket 86. An endless chain 88 is placed over the sprockets 80–86 to define a generally horizontal flight 90 extending between sprocket wheels 80 and 82, a generally vertical flight 92 extending between sprocket wheels 82 and 84 and a generally inclined return flight 94 extending between the sprocket wheels 84 and 80. In this arrangement, sprocket 80 is the drive sprocket while sprocket wheels 82, 84 and 86 function as idlers to change the direction of the endless chain 88. While only the layout of the various sprocket wheels associated with the bearing plates 68 and 70 have been described, it is to be understood that a similar chain and sprocket assembly is journaled between the bearing plates 72 and 74 as well.

In FIG. 2, there is shown a further wheel 96 which is fixedly attached to an axle 98 which is journaled for rotation in bearing blocks 100, 102 and 104, each of which is secured to a structural member comprising the secondary or upper frame assembly 40. When in its seed-planting mode, the wheel 96 engages the ground and as the planter 10 is pulled by a tractor or other type of farm vehicle, the shaft 98 is driven. A pulley 106 preferably having adjustable sheaves is fixedly secured to the shaft 98 so as to rotate therewith. Also journaled for rotation in the secondary or upper frame 40 is a driven shaft 108 upon which is attached a pair of V-belt pulleys 109 and 110 of a fixed diameter and an endless V-belt 112 surrounds the pulleys 106 and 109 or 110 so that as the wheel 96 is rotated so is the shaft 108. By providing two pulleys 109 and 110 of an appropriate diameter, the belt 112 can be moved to obtain a different speed ratio for soybeans rather than corn, for example.

Now, with reference to FIGS. 5 and 6, it can be observed that the shaft 108 passes through the bearing plate 70 and has the drive sprocket 80 fastened to it with the end of the shaft 108 being journaled in a bearing 114 secured to the bearing plate 68. Thus, rotation of the wheel 96 results in the conveyor chain 88 being driven. The relative speed at which the conveyor chain moves can, of course, be adjusted by adjusting the relative diameters of the pulley 106.

Figure 8:
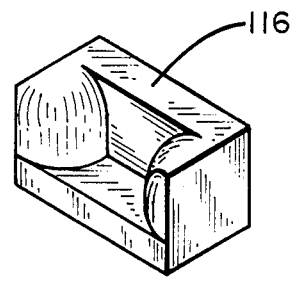
FIG. 8 is an enlarged view of a seed pocket of the type attached to the conveyor chain of FIG. 7 for handling seed corn.

Continuing with the description of the constitutional features of the preferred embodiment and with particular reference to FIG. 8, the conveyor chain 88 has secured to its outer edge a plurality of seed-receiving pockets 116. A perspective view of one such seed pocket is shown in FIG. 8. The particular contour of the seed pocket has been found to facilitate the entry and exit of a single seed of corn into each pocket as it rotates orbitally with the endless chain 88. If the planter 10 is to be used with other row crops, such as soybeans, then a separate chain having seed pockets dimensional to accommodate seed soybeans would be substituted for the chain 88 with pockets 116. The substitution is easily accomplished by using the master link which joins the two ends of the corn planter chain together to join the end links of the corn planting chain to the soybean planting chain and then pulling the soybean planting chain around the sprocket wheels. As the first chain is removed, the new chain is substituted.

The cross-sectional view of FIG. 6 perhaps best illustrates the relative orientation of the upper horizontal flight 90 of the chain 88 as it traverses the longitudinal slit 66 formed in the base in the hopper 58. Numeral 118 identifies a support rail upon which the horizontal flight 90 of the chain 88 rests and atop the chain are the seed pockets 116. The support rail 118 prevents the flight 90 from sagging and maintains the seed pockets at the appropriate elevation relative to the slit 66 so that a seed passing therethrough will find its way into a seed pocket 116. Once a given seen pocket is occupied with a seed, other seeds are blocked from entering. Thus, as the flight 90 of the chain 88 moves along the guide rail 118 by virtue of being driven by the sprocket 80, seeds will flow from the hopper and will find their way into vacant seed pockets. Because the hopper bottom segment 60 overlaps the hopper bottom segment 64 proximate the gap 66, the weight of the seeds in the hopper 58 is not applied to the seeds flowing through the gap and they tend not to bind at the point of entry into the moving seed pockets. Also, the plural spacedapart support elements disposed between plates 60 and 64 prevent the seed exit slot 62 from narrowing due to the weight of seed in the hopper.

Figure 3:
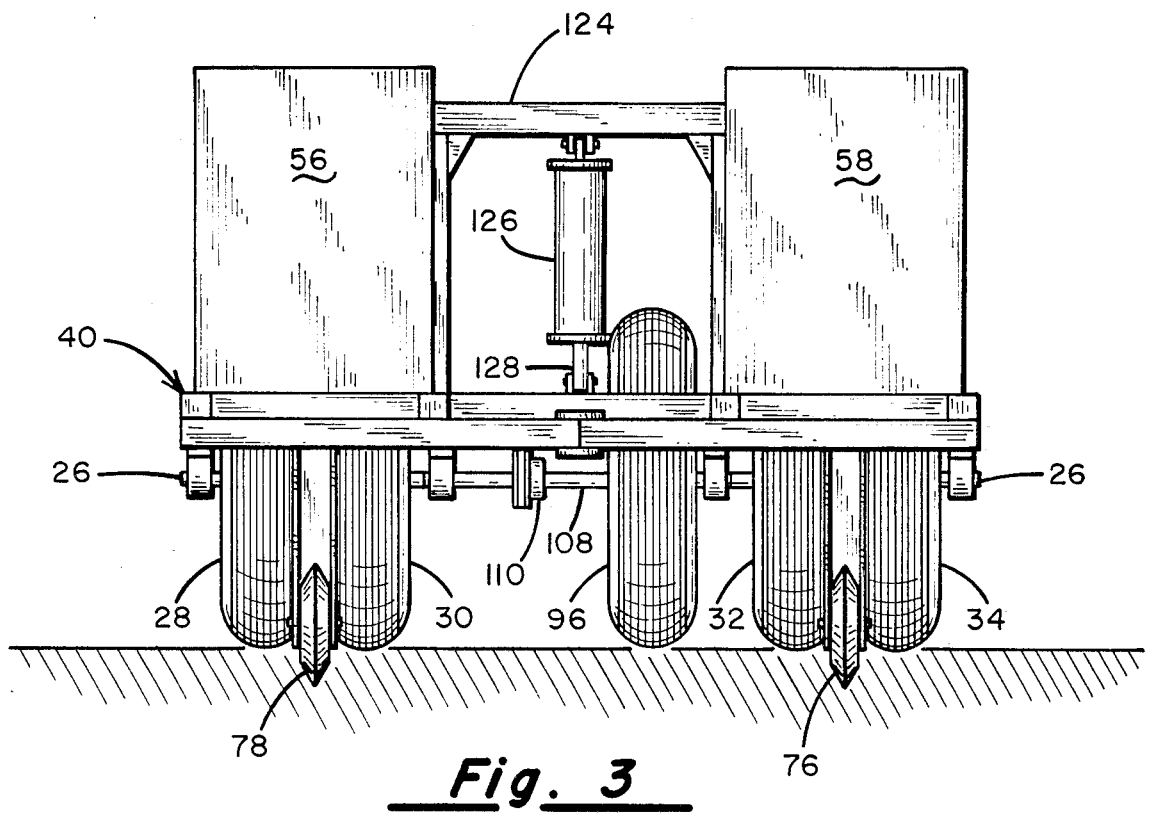
FIG. 3 is a front view of the preferred embodiment of FIG. 1.

Next, referring to FIGS. 1 and 3, it can be seen that welded to the main frame 12 and specifically to the longitudinal braces 22 and 24 thereof are uprights 120 and 122 which are spanned at their upper end by a cross-bar 124. Operatively disposed between the cross-bar 124 and the strut 42 of the secondary frame 40 is a hydraulic actuator 126. The actuator 126 is shown with its piston rod retracted in FIG. 1 and, with reference to FIG. 4, it can be seen that when the piston rod 128 of the hydraulic actuator 126 is extended, it causes the secondary frame 40 to pivot about the axle 26 to the disposition illustrated by the phantom lines in FIG. 4. In this latter disposition, the colters 76 and 78 as well as the driving wheel 96 are elevated free of the ground, and, accordingly, the conveyor chain with its seed pockets is stationary.

Having described the details of the constructional features of the invention, consideration will next be given to its modes of operation.

OPERATION

To begin with, the farmer will fill each of the large capacity seed hoppers 56 and 58 with the seed to be planted and then will tow the planter 10 to the site where the seed is to be sewn. In route, the hydraulic actuator 126 will have been actuated so that the secondary frame assembly 40 and the various components suspended from it will be tilted as shown in FIG. 4 so that the colters 76 and 78 do not engage the ground and so that the conveyor chains driven by the wheel 96 and shafts 98 and 108 do not move.

Once the location is reached where planting is to take place, the hydraulic actuator 126 is operated to retract its piston rod 128 into its cylinder. Under this condition, the secondary frame is lowered to the position represented by the solid lines in FIG. 4 and to the position reflected in the views of FIGS. 1 and 3 as well. Here, the wheel 96 engages the ground so that when the planter assembly is towed by a tractor or the like, the wheel will drive the shaft 98 which, because of the belt/pulley coupling, will also drive shaft 108. Rotation of the shaft 108 drives the sprocket 80 and causes the chain 88 to move. Because of the manner in which the seed pockets 116 are disposed on the chain and routed past the slit 66 formed in the bottom of each of the hoppers, seed will be individually fed from the hopper through the slit into the seed pockets. The upper flight 90 of the chain is supported at the appropriate elevation to receive seed by means of a guide rail 118 positioned beneath the flight 90. As the chain moves, the seeds are carried in their pockets to vertical flight 92 and as a seed pocket carrying a seed turns about the sprocket 84, the seed falls free of the pocket. In that the colter 76 is traversing the grounds in advance of the conveyor chain, it has already created a furrow in the ground into which the seed will fall.

By using pulley 106 of adjustable diameter, it is possible to adjust the spacing of the seed dropped from approximately four inches to approximately ten inches. As the planter continues along its path, the furrows formed by the colters 76 and 78 are closed over by the passage of the dual wheels 28–30 and 32–34 following the placement of the seeds in the furrow. Thus, the seeds are totally covered and will not be consumed by birds or the like. Also, the seeds will be positioned at an optimum depth to enhance germination.

As the farmer reaches the end of a planting row, he again may actuate the cylinder 126 to lift the colters and the drive wheel 96 from the ground as he negotiates a turn prior to traversing a new row to be planted. This, of course, terminates seed flow.

Because flight 90 of the chain extends generally parallel to the bottom of the hoppers 56 and 58, those hoppers can carry a substantially greater amount of seed than can be carried by the hoppers in the aforereferenced Adams patent. Also, because of the manner in which the hopper floor segment 60 overlaps the hopper floor segment 64 proximate the seed exiting slit, improved seed flow results because the seeds exiting the slot 66 are not subject to the pressure of the seed load contained in the hopper. By using the orbital path for the conveyor chain 5 illustrated in FIG. 5, the seeds are carried to a point close to the ground before they are dropped into the furrow. This prevents the seed from bouncing and being misplaced. The bearing plates 68–70 and 72–74 shield the conveyor chain so that dirt cannot gum up the seed pockets prior to their return to their seed-receiving disposition.

Because the seed conveyor chain 88 and the pockets carried thereby never contact the ground, the seed planter of the present invention can be towed at a speed significantly in excess of that allowed by prior art designs, especially the one reflected in the aforereferenced Adams patent. This higher travel speed along with the increased hopper capacity allows significant savings in planting time over known prior art planters.

Also, it is to be understood that while the arrangement shown in FIG. 2 utilizes only two hoppers and seed feeding conveyor assemblies, persons skilled in the art can readily design a similar system incorporating additional hoppers and conveyor assemblies without departing from the scope of the invention. Also, the foregoing description has been given illustrating the invention in the planting of corn and soybeans. It is to be understood, however, that the system is not limited to those grains and that with minor modifications, the invention can be used to plant other seeds as well.

SECOND PREFERRED EMBODIMENT

FIGS. 9 and 10 are directed to an alternative preferred embodiment. The primary difference between this alternative embodiment and the embodiment described above is that the seed discharge mechanism is driven by a constant torque hydraulic motor rather than by a wheel such as 96 (FIG. 1) which engages the ground.

Shown in FIG. 9 is the constant torque hydraulic motor 200. Connected to this motor by an inlet hydraulic hose 201 and an outlet hydraulic hose 202 is a flow control valve 203 which is mounted inside the tractor cab. Couplers 204 and 205 are associated with the hydraulic hoses 201 and 202 to permit easy connection and disconnection of the hoses from the flow control valve 203.

The constant torque hydraulic motor 200 is present to drive a shaft 206. A miter gear 207 is fixedly secured to shaft 206 so as to rotate therewith. The gear 207, shaft 206 and motor 200 are positioned to permit gear 207 to mesh with a second miter gear 208 which is fixedly secured to shaft 108 (FIG. 2). Thus, when the motor is in operation, it rotates shaft 206 and gear 207 which in turn rotates gear 208 and shaft 108. Since shaft 108, in this alternative embodiment, is ultimately driven by the motor 200, there is no need for wheel 96, shaft 98, pulleys 106 and 110 or belt 112. A hydraulic motor well suited to the present use is the Char-lyn H-series constant torque hydraulic motor sold by the Hydraulics Division of the Eaton Corporation of Eden Prairie, Minnesota.

As shown in FIG. 10, the manner in which shaft 108 drives the remainder of the apparatus (i.e., sprocket 80, chain 88, seed pockets, 116, etc.) is identical to what has been described above in connection with the first embodiment.

As those skilled in the art will recognize, the spacing of the seed will ultimately depend upon the rate at which the motor 200 rotates shaft 206 which in turn rotates gears 207 and 208, shaft 108, sprocket 80 and chain 88.

This is controlled by the flow control valve 203 located in the tractor cab. Adjusting valve 203 to increase or restrict flow through the lines 201 and 202 alters the rotational speed at which shaft 206 as driven by motor 200. Also associated with the constant torque hydraulic motor 200 is a counter 209 which counts the revolutions per minute at which the motor 200 drives shaft 206. The counter 209 then transmits an electrical signal by means (not shown) to a digital readout device 210 which is also located in the cab. This digital readout 210 is designed to display the seeds per acre in thousands that are being discharged by the seed planter. The rpm counter and the digital display are of known designs and permit the user to readily adjust the flow control valve 203 from his position in the tractor cab to control the discharge rate of seed and, thus plant the seed at the optimum distance from each other.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. A seed planting apparatus, comprising:
   (a) a first generally rectangular frame assembly;
   (b) an axle extending transversely to the intended direction of travel of said seed planting apparatus;
   (c) wheels journaled for rotation on said axle for supporting said first frame above ground;
   (d) a second frame carried atop said first frame generally forward of said axle and having a lever arm secured to said second frame, said lever arm being pivotable about said axle;
   (e) at least one colter attached to said second frame and extending downwardly therefrom forward of said wheels;

(f) a box-like hopper having mutually perpendicular side walls and a downwardly sloping bottom terminating in an elongated slit;

(g) an endless chain deployed about a plurality of sprocket wheels so as to have a generally horizontal flight aligned with said elongated slit, a generally vertical flight directed toward the ground and a return flight, said endless chain having a plurality of regularly spaced seed-carrying pockets fastened thereto; and (h) means for driving said endless chain at a predetermined velocity whereby seeds flow from said hopper into said seed pockets and are released proximate the ground in the furrow created by said colter, said furrow being closed over the seed by the passage of said wheels proximate said furrow.

2. The seed planting apparatus as in claim 1 wherein said plurality of sprocket wheels and said colter are journaled for rotation between parallel, spaced-apart bearing plates.

3. The seed planting apparatus as in claim 1 wherein the bottom of said hopper is comprised of two downwardly inclined members, each having one end integrally joined to said mutually perpendicular side walls and the other end terminating in an overlapping relationship with one another and with a gap of a predetermined height disposed therebetween.

4. The seed planting apparatus as in claim 1 and further including a support rail disposed immediately beneath said horizontal flight for supporting said horizontal flight from sagging.

5. The apparatus as in claim 1 wherein said seed-carrying pockets comprise links of said endless chain.

6. The seed planting apparatus as in claim 1 wherein said means for driving said endless chain comprises:
(a) a further ground engageable wheel secured to a first shaft, said first shaft being journaled for rotation in said second frame;
(b) a pulley mounted on said first shaft;
(c) a second shaft journaled for rotation in said second frame and disposed parallel to said first shaft and having a further pulley affixed thereto, said second shaft also driving one of said plurality of sprocket wheels; and
(d) belt means joining said pulley and said further pulley.

7. The seed planting apparatus as in claim 6 and further including means disposed between said first frame and said lever arm for selectively raising and lowering said colter and said further wheel from and to the ground.

8. The seed planting apparatus as in claim 7 wherein said means disposed between said first frame and said lever arm comprises a hydraulic cylinder.

9. The seed planting apparatus as in claim 8 wherein said plurality of sprocket wheels and said colter are journaled for rotation between parallel, spaced-apart bearing plates.

10. The seed planting apparatus as in claim 8 wherein the bottom of said hopper is comprised of two downwardly inclined members, each having one end integrally joined to said mutually perpendicular side walls and the other end terminating in an overlapping relationship with one another and with a gap of a predetermined height disposed therebetween.

11. The seed planting apparatus as in claim 8 and further including a support rail disposed immediately beneath said horizontal flight for supporting said horizontal flight from sagging.

12. The seed planting apparatus as in claim 6 wherein said pulley and said further pulley are of a selectively variable effective diameter.

13. The apparatus of claim 1 wherein said means for driving said endless chain comprises:
(a) a motor secured to a first shaft, said first shaft being journaled for rotation in said second frame;
(b) a gear mounted on said first shaft, and
(c) a second shaft journaled for rotation in said second frame and disposed perpendicular to said first shaft and having a further gear affixed thereto, said second shaft also driving one of said plurality of sprocket wheels and said gear and said further gear meshing with each other to cause rotation of said second shaft at a predetermined step-down ratio with respect to said first shaft.

14. The seed planting apparatus as in claim 13 wherein said motor is a manually speed-controlled motor.

15. The seed planting apparatus as in claim 14 wherein said manually speed-controlled motor is a constant torque hydraulic motor.

16. A seed planting apparatus, comprising:
(a) a generally rectangular frame assembly adapted to be pulled by a motor vehicle;
(b) an axle extending transversely to the intended direction of travel of said seed planting apparatus;
(c) wheels journaled for rotation on said axle for supporting said frame above the ground;
(d) at least one colter attached to said frame and extending downwardly therefrom forward of said wheels;
(e) a box-like hopper having mutually perpendicular side walls and a downwardly sloping bottom terminating in an elongated slit;
(f) an endless chain deployed about a plurality of sprocket wheels so as to have a generally horizontal flight aligned with said elongated slit, a generally vertical flight directed toward the ground and a return flight, said endless chain having a plurality of regularly spaced seed-carrying pockets fastened thereto;
(g) motor means mounted on said frame for driving said endless chain at a predetermined velocity independent of the vehicle's ground speed whereby seeds flow from said hopper into said seed pockets and are released proximate the ground in the furrow created by said colter, said furrow being closed over the seed by the passage of said wheels therealong;
(h) control means disposed in said motor vehicle and operatively coupled to said motor means for allowing manual adjustment of said predetermined velocity; and
(i) indicator means also in said rotor vehicle for displaying the density at which seeds are being planted as a function of the speed at which said endless chain is driven for a given ground speed of said motor vehicle.

17. The seed planting apparatus of claim 16 wherein said indicator includes a counter and a digital readout, said counter counting the revolutions of the shaft of said motor means.

18. The apparatus as in claim 16 wherein said seed-carrying pockets comprise links of said endless chain.

* * * * *